US011131876B2

(12) United States Patent
Takada et al.

(10) Patent No.: US 11,131,876 B2
(45) Date of Patent: Sep. 28, 2021

(54) LIQUID CRYSTAL DISPLAY DEVICE WITH A DISPLAY SURFACE OF A PLANAR SHAPE

(71) Applicant: MITSUBISHI ELECTRIC CORPORATION, Tokyo (JP)

(72) Inventors: Yuriko Takada, Tokyo (JP); Akimasa Yuuki, Tokyo (JP); Takanori Okumura, Tokyo (JP); Tetsuya Satake, Tokyo (JP); Taro Kumagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/308,183

(22) PCT Filed: Apr. 2, 2015

(86) PCT No.: PCT/JP2015/060499
§ 371 (c)(1),
(2) Date: Nov. 1, 2016

(87) PCT Pub. No.: WO2015/190164
PCT Pub. Date: Dec. 17, 2015

(65) Prior Publication Data
US 2017/0052408 A1    Feb. 23, 2017

(30) Foreign Application Priority Data

Jun. 11, 2014  (JP) .............................. JP2014-120194

(51) Int. Cl.
*G02F 1/1335*   (2006.01)
*G02F 1/1333*   (2006.01)

(52) U.S. Cl.
CPC ...... *G02F 1/133528* (2013.01); *G02F 1/1333* (2013.01); *G02F 1/1335* (2013.01);
(Continued)

(58) Field of Classification Search
CPC combination set(s) only.
See application file for complete search history.

(56) References Cited

U.S. PATENT DOCUMENTS 5,704,703 A * 1/1998 Yamada ................. G01D 11/28
349/65
8,690,414 B2   4/2014 Tomotoshi et al.
(Continued)

FOREIGN PATENT DOCUMENTS

CN    102272814 A    12/2011
JP    10-123495 A    5/1998
(Continued)

OTHER PUBLICATIONS

International Search Report dated Jun. 23, 2015, in PCT/JP2015/060499, filed Apr. 2, 2015.
(Continued)

*Primary Examiner* — Lauren Nguyen
(74) *Attorney, Agent, or Firm* — Xsensus LLP

(57) ABSTRACT

In a liquid crystal display device, the liquid crystal panel has a display surface of a planar shape on which a plurality of pixels are located. The front protective plate is located so as to face the display surface of the liquid crystal panel. The optical path changing portion is located between an emission surface of the front protective plate and an air layer located closer to the back side than the emission surface is and located closest to the emission surface. The optical path changing portion changes an optical path of light that enters the optical path changing portion so as to expand an emission angle when the incident light is emitted from the emission surface of the front protective plate.

14 Claims, 10 Drawing Sheets

(52) U.S. Cl.
CPC .... *G02F 1/133504* (2013.01); *G02F 2201/50* (2013.01); *G02F 2202/28* (2013.01)

(56) References Cited

U.S. PATENT DOCUMENTS

| | | | |
|---|---|---|---|
| 2003/0012532 A1 | 1/2003 | Prigent | |
| 2006/0038935 A1 | 2/2006 | Kim | |
| 2009/0085831 A1 | 4/2009 | Odoi et al. | |
| 2010/0118516 A1* | 5/2010 | Nakagome | G02B 5/0242 362/97.1 |
| 2010/0182534 A1* | 7/2010 | Usukura | G02B 3/0056 349/62 |
| 2011/0012852 A1* | 1/2011 | Takahashi | G02F 1/13338 345/173 |
| 2011/0242686 A1 | 10/2011 | Watanabe | |
| 2011/0255301 A1 | 10/2011 | Watanabe | |
| 2011/0273644 A1* | 11/2011 | Yamahara | G02B 5/02 349/64 |
| 2011/0310470 A1* | 12/2011 | Horie | G02F 1/133502 359/352 |
| 2012/0032201 A1* | 2/2012 | Chou | G09F 9/301 257/88 |
| 2012/0069273 A1 | 3/2012 | Watanabe | |
| 2012/0200816 A1* | 8/2012 | Krasnov | G02F 1/133308 349/137 |
| 2013/0242230 A1* | 9/2013 | Watanabe | G02F 1/133504 349/64 |

FOREIGN PATENT DOCUMENTS

| | | |
|---|---|---|
| JP | 2000-250432 A | 9/2000 |
| JP | 2002-358032 A | 12/2002 |
| JP | 2009-104112 A | 5/2009 |
| JP | 2010-78761 A | 4/2010 |
| JP | 2010/055671 A1 | 5/2010 |
| JP | 2010-256769 A | 11/2010 |
| WO | 2010/106782 A1 | 9/2010 |

OTHER PUBLICATIONS

International Preliminary Report on Patentability and Written Opinion dated Dec. 22, 2016 in PCT/JP2015/060499 (with English language translation).

Combined Office Action and Search Report dated Dec. 3, 2018 in Chinese Patent Application No. 201580028386.X, 11 pages (with unedited computer generated English translation).

Chinese Office Action dated Sep. 23, 2019 in Chinese Patent Application No. 201580028386.X (with English translation), 10 pages.

German Office Action dated May 31, 2021 in German Application No. 11 2015 002 741.6.

* cited by examiner

F I G. 1
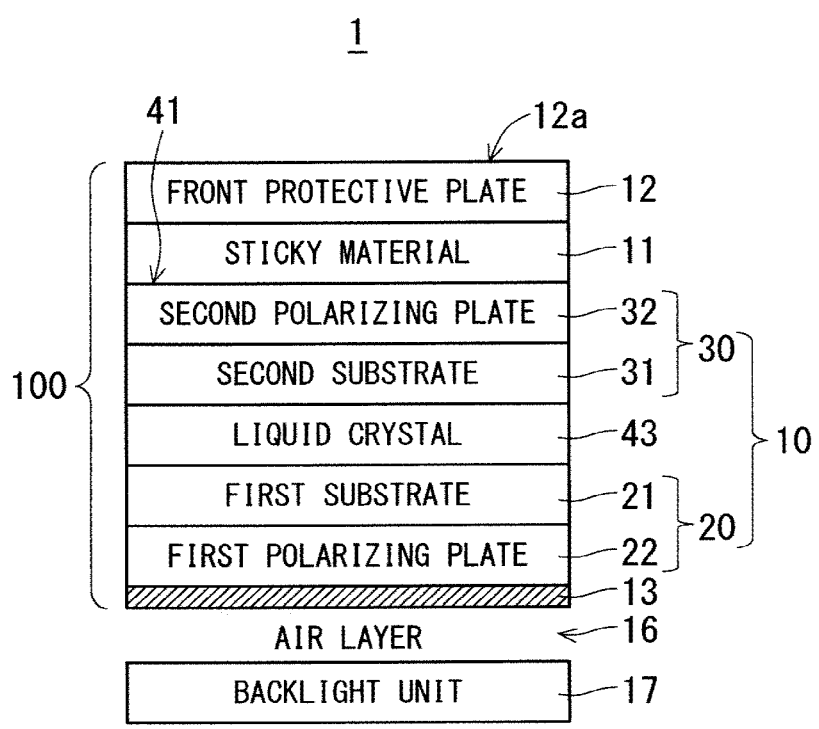

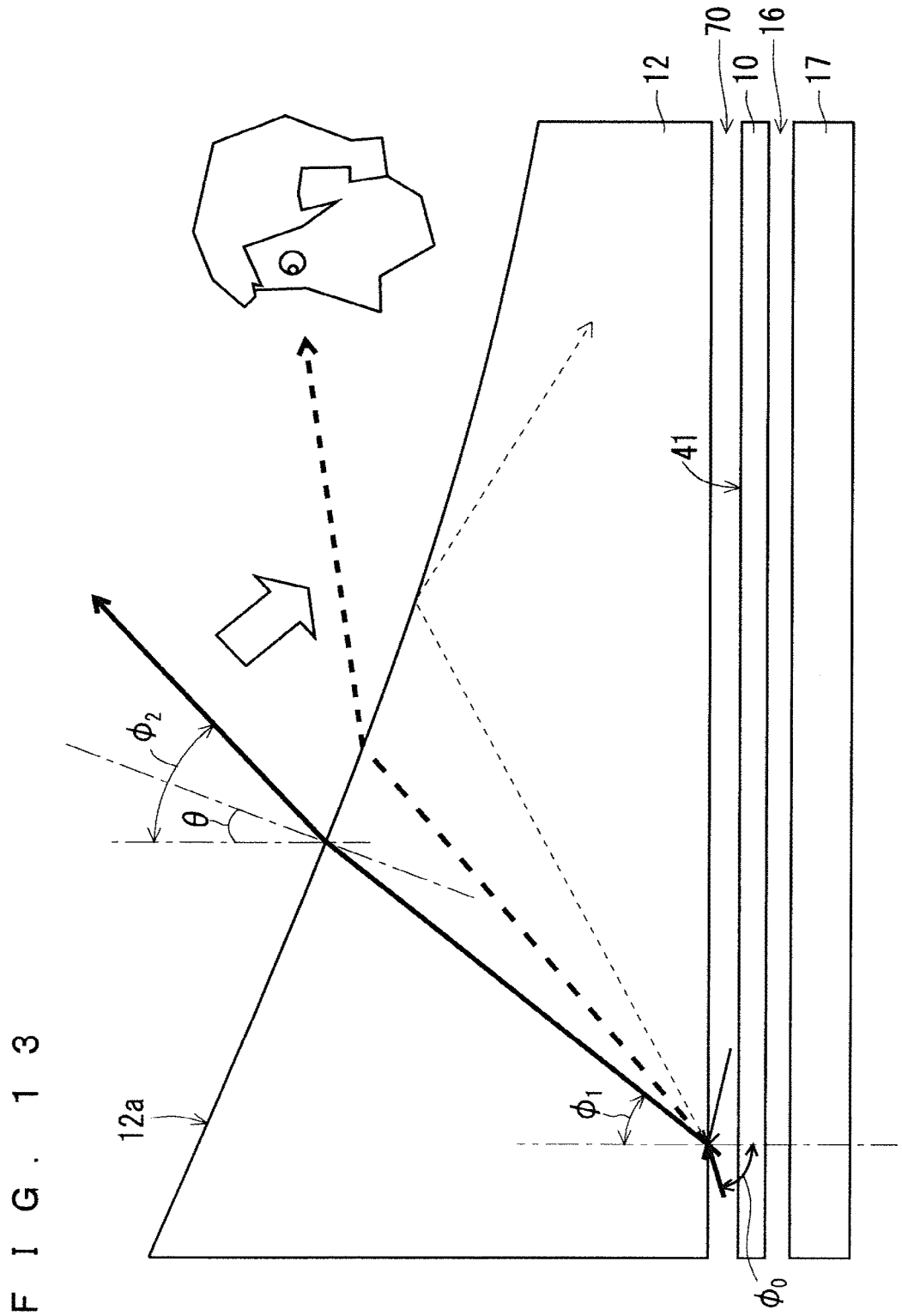

F I G . 1 4
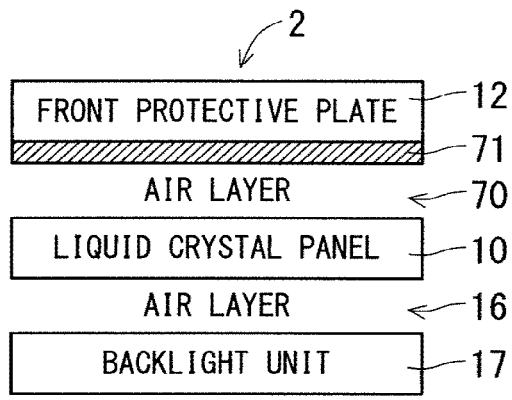
F I G . 1 5
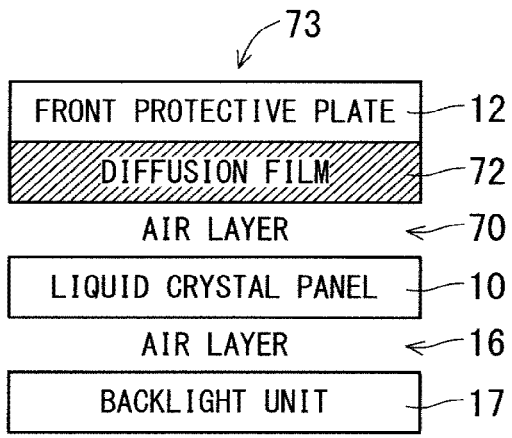
F I G . 1 6
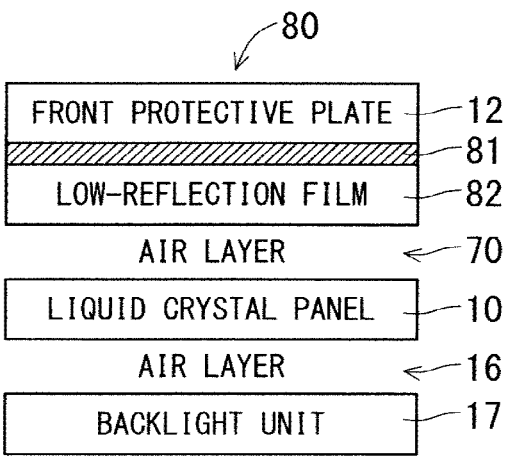

LIQUID CRYSTAL DISPLAY DEVICE WITH A DISPLAY SURFACE OF A PLANAR SHAPE

TECHNICAL FIELD

The present invention relates to a liquid crystal display device, and more particularly, to a liquid crystal display device capable of displaying a curved image.

BACKGROUND ART

Liquid crystal display devices are planar display devices used for portable information equipment or the like typified by personal computers by exploiting the characteristics such as light weight, low profile, and low power consumption.

The liquid crystal display device includes a liquid crystal panel having liquid crystals sandwiched between one pair of substrates bonded to each other, the substrates including an array substrate that includes a pixel electrode and a color filter substrate that includes a common electrode. The liquid crystal display device performs a display of an image by changing a molecular orientation of the liquid crystals through application of voltage between the pixel electrode and the common electrode and by controlling transmittance of light passing through the liquid crystals.

For example, a substrate of a parallel plate shape having a planar surface (hereinafter may be referred to as a "planar substrate") is used as a substrate forming each of the array substrate and the color filter substrate. A curved image needs to be displayed on the liquid crystal display device by, for example, bending the planar substrate used for the liquid crystal display device to a given curvature from the viewpoint of design of the liquid crystal display device.

To meet the needs, various methods including a method for applying a flexible material such as plastic to a substrate, a method for deforming a liquid crystal display device into a curved shape to fix a glass substrate that is thinned to be bendable, or the like have been proposed.

For example, a liquid crystal display device including a housing that has stiffness higher than that of a liquid crystal panel and that has a groove keeping the curvature of the liquid crystal panel in curved sides, a liquid crystal display device including a curved frame that holds a liquid crystal panel together with a backlight unit, or the like has been proposed.

However, display unevenness occurs around the four corners of the liquid crystal panel in these liquid crystal display devices. The measures against this problem have been proposed, but all of the measures have problems such that a display defect may partially occur. The frame portion may also increase.

For a curved large-screen liquid crystal panel, a misalignment in the curved direction occurs between the array substrate and the color filter substrate due to a difference in radius of curvature, thereby causing the display defect such as leakage of light.

These problems occur when the liquid crystal panel of the parallel plate shape is curved. Patent Documents 1 to 3, for example, disclose technologies for displaying a curved image without the occurrence of the problems due to bending.

For example, Patent Document 1 discloses a display device that includes a display element of the parallel plate shape and an optical element located close to the display element and that has a nonplanar display surface. For example, a fiber that optically transmits image light entering from the display element to a nonplanar emission surface is used as the optical element.

Patent Document 2 discloses a display device that includes a light adjusting portion of the parallel plate shape such as the liquid crystal panel and a light-emitting layer having a curved display surface or a bent display surface.

Patent Document 3 discloses a light-emitting display device that includes a plurality of display panels of the parallel plate shape fixed on a back surface of a curved translucent base material and that has a curved display surface.

The optical element having high straightness of light transmits the image on the planar display surface to the nonplanar emission surface in the configuration disclosed in Patent Document 1, so that the image fails to be recognizable when an angle of an observation direction (hereinafter may be referred to as an "observation angle") with respect to the emission surface is large.

In the configuration disclosed in Patent Document 2, a position of a pixel of the planar light adjusting portion such as the liquid crystal panel corresponds to a position of each light emitter of the curved display surface so as to overlap each other when the display device is seen in plan view. Thus, the image fails to be accurately recognizable from an angle deviated from the observation angle when the display device is seen in plan view.

The configuration disclosed in Patent Document 3 includes an air layer located between the curved translucent base material and the display panel, thereby causing strong external light reflection and display of a shadow of the base material on the display panel. Further, the size of the display panel needs to be reduced in the curved direction for smooth curved images, so that the number of installed lightproof bonding members increases, thereby degrading the appearance.

For these problems, a liquid crystal display device in which a protective plate having a nonplanar surface on an observer side is located on a front surface of a liquid crystal panel having the parallel plate shape has been proposed. The liquid crystal display device allows the observer to see a virtual image, which is an image standing out from the liquid crystal panel, according to a thickness of the protective plate. This is a lens effect of the protective plate, and the observer recognizes the virtual image as the image of the curved liquid crystal panel.

The liquid crystal display device can achieve the display of the curved image in the simple structure without the need for the complicated design of the liquid crystal panel and a housing portion that holds the liquid crystal panel therein.

PRIOR ART DOCUMENT

Patent Document

Patent Document 1: Japanese Patent Application Laid-Open No. 2009-104112

Patent Document 2: Japanese Patent Application Laid-Open No. 2010-78761

Patent Document 3: Japanese Patent Application Laid-Open No. 2010-256769

SUMMARY OF INVENTION

Problems to be Solved by the Invention

As described above, for the liquid crystal display device in which the nonplanar protective plate toward the observer is located on the front surface of the liquid crystal panel having the parallel plate shape in order to make the curved image recognizable, the observer fails to recognize the image when the angle of the emission surface with respect to the liquid crystal panel is large or when the observation angle with respect to the emission surface is large.

It is an object of the present invention to provide a liquid crystal display having a relatively wide viewing angle and being capable of displaying an image with relatively high display quality on a nonplanar display surface.

Means to Solve the Problems

A liquid crystal display device of the present invention includes: a liquid crystal panel with a display surface of a planar shape in which a rectangular display region including a plurality of pixels located therein is formed, the liquid crystal panel including a first substrate having a rectangular shape, a second substrate that is located so as to face the first substrate in a position closer to an observer side than the first substrate is and that has the rectangular shape, liquid crystals sandwiched between the first substrate and the second substrate, a first polarizing plate bonded to a surface of the first substrate opposite to the side facing the liquid crystals, and a second polarizing plate bonded to a surface of the second substrate opposite to the side facing the liquid crystals, a front protective plate that is located so as to face the display surface of the liquid crystal panel in a position closer to the observer side than the liquid crystal panel is and that has a surface, as an emission surface of a nonplanar shape, opposite to the side facing the display surface; and an optical path changing portion that is located between the emission surface of the front protective plate and an air layer located closer to the back side than the emission surface is and located closest to the emission surface and that changes an optical path of incident light so as to expand an emission angle when the incident light is emitted from the emission surface.

Effects of the Invention

The liquid crystal display device of the present invention includes the liquid crystal panel and the front protective plate. The liquid crystal panel includes the first substrate having the rectangular shape, the second substrate that is located so as to face the first substrate in the position closer to the observer side than the first substrate is and that has the rectangular shape, the liquid crystals sandwiched between the first substrate and the second substrate, the first polarizing plate bonded to the surface of the first substrate opposite to the side facing the liquid crystals, and the second polarizing plate bonded to the surface of the second substrate opposite to the side facing the liquid crystals. The liquid crystal panel has the planar display surface in which the rectangular display region including the plurality of pixels located therein is formed. The front protective plate is located so as to face the display surface of the liquid crystal panel in the position closer to the observer side than the liquid crystal panel is and that has the surface, as the nonplanar emission surface, opposite to the side facing the display surface.

The liquid crystal display device includes the optical path changing portion located between the emission surface of the front protective plate and the air layer located closer to the back side than the emission surface is and located closest to the emission surface. The optical path changing portion changes the optical path of the incident light so as to expand the emission angle when the incident light is emitted from the emission surface of the front protective plate.

The optical path changing portion can expand the traveling direction of the light inside the front protective plate, and thus the emission angle can be expanded. Consequently, a nonplanar image can be visually recognized from the relatively wide angle. Therefore, the liquid crystal display device having the relatively wide viewing angle and being capable of displaying the image with relatively high display quality on the nonplanar display surface can be achieved.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a cross-sectional view showing a configuration of a liquid crystal display device 1 in a first embodiment of the present invention.

FIG. 13 is a cross-sectional view showing a configuration that is cut in the curved direction of the emission surface 12a of the front protective plate 12.

FIG. 14 is a cross-sectional view showing a configuration of a liquid crystal display device 2 in a fourth embodiment of the present invention.

FIG. 15 is a cross-sectional view showing a configuration of a liquid crystal display device 73 in the other example of the liquid crystal display device in the fourth embodiment of the present invention.

FIG. 16 is a cross-sectional view showing a configuration of a liquid crystal display device 80 in a fifth embodiment of the present invention.

DESCRIPTION OF EMBODIMENTS

First Embodiment

Figure 2:
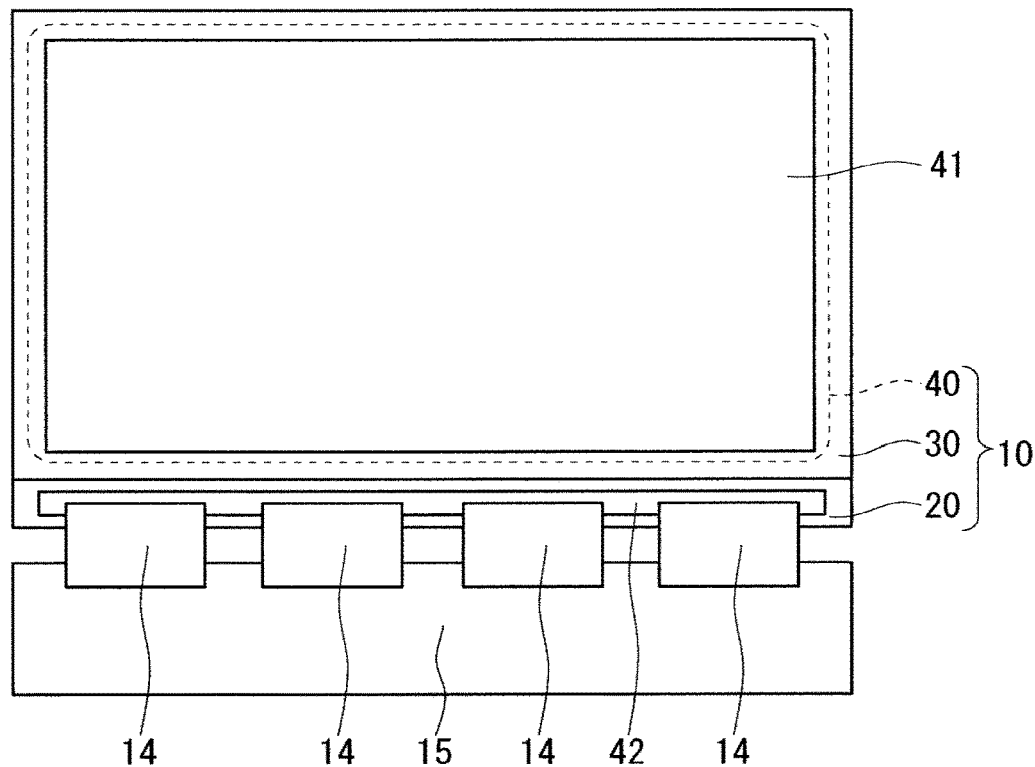
FIG. 2 is a plan view showing a configuration of a panel unit 100 forming the liquid crystal display device 1 in the first embodiment of the present invention.
Figure 3:
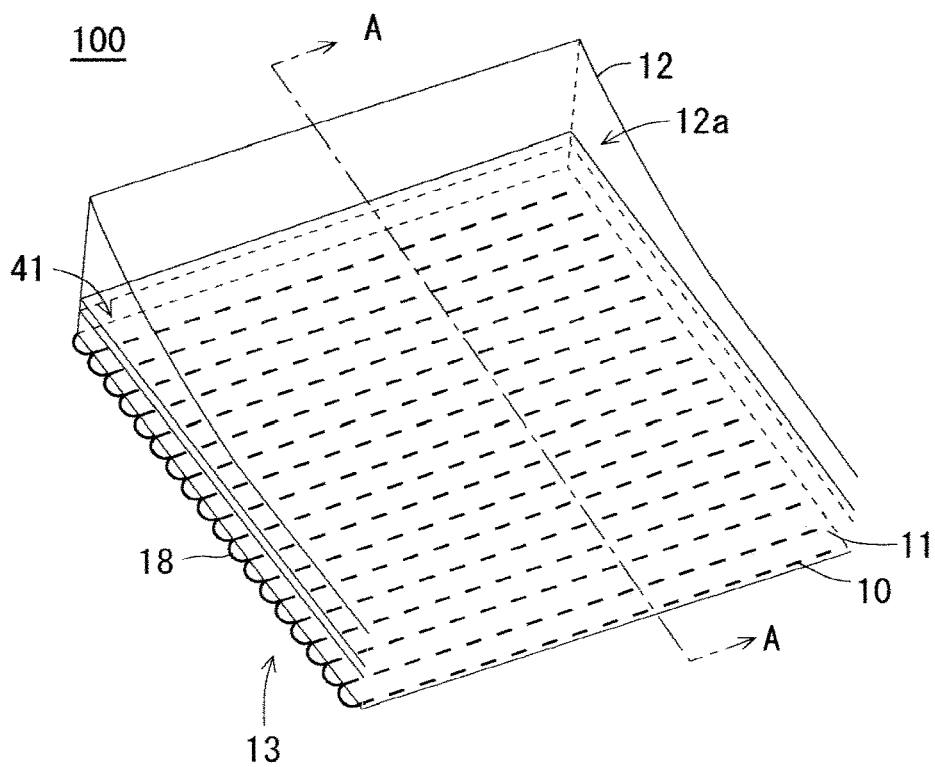
FIG. 3 is a perspective view showing the configuration of the panel unit 100 forming the liquid crystal display device 1 in the first embodiment of the present invention.

FIG. 1 is a cross-sectional view showing a configuration of a liquid crystal display device 1 in a first embodiment of the present invention. FIG. 2 is a plan view showing a configuration of a panel unit 100 forming the liquid crystal display device 1 in the first embodiment of the present invention. FIG. 3 is a perspective view showing the configuration of the panel unit 100 forming the liquid crystal display device in the first embodiment of the present invention. A sticky material 11 and a front protective plate 12 are omitted from FIG. 2 for easy interpretation.

FIG. 1 and the following diagrams are schematically shown and do not reflect an accurate size or the like of structural components shown in each of the diagrams. Further, a display pixel pattern and a configuration of a film are omitted from each of the diagrams. An overall configuration of the liquid crystal display device is common to all embodiments unless otherwise indicated.

The liquid crystal display device 1 includes the panel unit 100 and a backlight unit 17. The panel unit 100 includes a liquid crystal panel 10, the sticky material 11, the front protective plate 12, and an optical path changing portion 13.

As shown in FIG. 2, the liquid crystal panel 10 has a display surface 41 that includes a plurality of pixels located therein and has a planar shape. The display surface 41 of the liquid crystal panel 10 is formed on a surface of the liquid crystal panel 10 on a viewing side. The front protective plate 12, which is omitted from FIG. 2, is located on a front surface being the display surface 41 of the liquid crystal panel 10. Specifically, the front protective plate 12 is located so as to face the display surface 41 of the liquid crystal panel 10.

As shown in FIG. 3, the front protective plate 12 has an emission surface 12a that is located opposite to the side facing the display surface 41 of the liquid crystal panel 10 and that has a nonplanar shape. The front protective plate 12 has a surface having a shape along the display surface 41 of the liquid crystal panel 10 on the side facing the display surface 41 of the liquid crystal panel 10. In other words, the surface of the front protective plate 12 facing the display surface 41 of the liquid crystal panel 10 has the shape along the display surface 41 of the liquid crystal panel 10. In this embodiment, the display surface 41 of the liquid crystal panel 10 has the planar shape, and the surface of the front protective plate 12 facing the display surface 41 of the liquid crystal panel 10 has the planar shape, and more particularly, the planar shape along the planar display surface 41.

The front protective plate 12 and the liquid crystal panel 10 are bonded to each other with the sticky material 11. The emission surface 12a, which is the surface seen from an observer side, of the front protective plate 12 has a concavely curved shape, for example. For example, FIG. 4, which will be described below, shows a cross-sectional view taken along a direction in which the emission surface 12a of the front protective plate 12 is curved (hereinafter may be referred to as a "curved direction").

The liquid crystal panel 10 is a liquid crystal panel operated with thin film transistors (TFTs) as switching elements in this embodiment. The liquid crystal panel 10 is not limited to this, and may be operated with the other switching elements.

As shown in FIG. 1, the panel unit 100 includes the backlight unit 17 as a light source that is located opposite to the display surface 41 of the liquid crystal panel 10 and faces an array substrate 20. FIG. 1 indicates the optical path changing portion 13 by hatch lines downward to the left.

Components of the panel unit 100 and the backlight unit 17 are fixed in peripheral portions thereof so as not to be shifted in an in-plane direction and a cross-sectional direction of the panel unit 100, to thereby form the liquid crystal display device 1.

Specifically, the liquid crystal panel 10 includes the array substrate 20 including the switching elements located therein and a color filter substrate 30 located so as to face the array substrate 20. The array substrate 20 and the color filter substrate 30 are bonded to each other with a sealing material 40.

The sealing material 40 is sandwiched between the array substrate 20 and the color filter substrate 30. Thus, FIG. 2 indicates the sealing material 40 by a dashed line through the color filter substrate 30.

The sealing material 40 is made of resin, for example. The sealing material 40 has a pattern so as to surround a region corresponding to the display surface 41 of the liquid crystal panel 10 that includes the array substrate 20 and the color filter substrate 30.

Liquid crystals 43 shown in FIG. 1 are surrounded by the sealing material 40 shown in FIG. 2 and injected into a gap created between the array substrate 20 and the color filter substrate 30. An inlet, which is omitted from FIG. 2, for the injection of the liquid crystals 43 is located in the pattern of the sealing material 40, and furthermore, the inlet is sealed with a sealing agent.

As shown in FIG. 1, the array substrate 20 includes a first substrate 21 and a first polarizing plate 22. The first substrate 21 is made of a transparent substrate, and more particularly, a translucent insulating substrate such as a glass substrate.

Although the illustration is omitted, the array substrate 20 includes: an alignment film that is located on a surface on the side facing the liquid crystals 43 in a thickness direction of the first substrate 21 and aligns the liquid crystals 43 in the region corresponding to the display surface 41; a pixel electrode that is located below the alignment film and applies voltage for driving the liquid crystals 43; a common electrode generating an electric field between the pixel electrode and the common electrode to drive the liquid crystals 43; the switching elements, such as the TFTs, supplying the voltage to the pixel electrode; an insulating film covering the switching elements; and gate wiring and source wiring supplying signals to the switching elements.

As shown in FIG. 2, the array substrate 20 includes a terminal 42 in a region outside the region corresponding to the display surface 41, and the terminal 42 receives signals supplied to the switching elements from the outside. The liquid crystal panel 10 includes a control substrate 15 equipped with, for example, a drive integrated circuit (IC) that transmits drive signals. The terminal 42 and the control substrate 15 are electrically connected to each other through flexible flat cables (FFCs) 14.

As shown in FIG. 1, the array substrate 20 includes the first polarizing plate 22 located on a surface opposite to the side facing the liquid crystals 43 in the thickness direction of the first substrate 21 (hereinafter may simply be referred to as the "surface opposite to the side facing the liquid crystals 43"). In other words, the first polarizing plate 22 is bonded to the surface of the first substrate 21 opposite to the side facing the liquid crystals 43 with a sticky material, which is not shown.

The color filter substrate 30 includes a second substrate 31 and a second polarizing plate 32. The color filter substrate 30 is located closer to the front protective plate 12 than the array substrate 20 is. Thus, the second substrate 31 is located closer to the front protective plate 12 than the first substrate 21 is. The second substrate 31 is located so as to face the first substrate 21. The liquid crystals 43 are sandwiched between the first substrate 21 and the second substrate 31.

The second substrate 31 is made of a transparent substrate, and more particularly, a translucent insulating substrate such as a glass substrate. Although the illustration is omitted, the color filter substrate 30 includes an alignment film that is located on a surface on the side facing the liquid crystals 43 in the thickness direction of the second substrate 31 (hereinafter may simply be referred to as the "surface on the side facing the liquid crystals 43") and that aligns the liquid crystals 43, and a color filter and a light-shielding layer that are located below the alignment film.

The color filter substrate 30 includes the second polarizing plate 32 located on a surface of the second substrate 31 opposite to the side facing the liquid crystals 43. In other words, the second polarizing plate 32 is bonded to the surface of the second substrate 31 opposite to the side facing the liquid crystals 43 with a sticky material, which is not shown.

The array substrate 20 and the color filter substrate 30 are bonded to each other with a gap material, which is not shown, for maintaining a fixed distance between both of the substrates. The gap material may be a granular gap material sprayed onto the substrate or a columnar gap material formed by resin patterned on one of the substrates.

In this embodiment, the optical path changing portion 13 is located on the surface of the liquid crystal panel 10 opposite to the side facing the front protective plate 12, and more particularly, the surface of the array substrate 20 opposite to the side facing the liquid crystals 43. More specifically, the optical path changing portion 13 is located on the surface, which is located opposite to the surface facing the first substrate 21, of the first polarizing plate 22 forming the array substrate 20.

The sticky material 11 fills between the liquid crystal panel 10 and the front protective plate 12. The sticky material 11 corresponds to a filling medium described below. The sticky material 11 has a refractive index higher than that of an air layer 16.

The liquid crystal panel 10 operates as described below. Upon an input of an electrical signal from the control substrate 15, a drive voltage is applied to the pixel electrode and the common electrode, and molecules of the liquid crystals 43 change in direction according to the drive voltage. Then, light emitted from the backlight unit passes through the array substrate 20, the liquid crystals 43, and the color filter substrate 30 to the observer side or is shielded. Consequently, a video or the like is displayed on the display surface 41 of the liquid crystal panel 10.

In this embodiment, the liquid crystal panel 10 is an in-plane switching (IPS) liquid crystal panel of a lateral electric field system in which the array substrate 20 includes the common electrode and the pixel electrode and an electric field is applied to the liquid crystals 43 between the electrodes, namely, laterally. The liquid crystal panel 10 is not limited to this, and may operate in another operation mode. For example, the operation mode of the liquid crystal panel 10 may be a vertically aligned (VA) mode, a twisted nematic (TN) mode, a super twisted nematic (STN) mode, or a ferroelectric liquid crystal mode.

A method for driving the liquid crystal panel 10 may be a simple matrix system, an active matrix system, or the like, for example. In this embodiment, the liquid crystal panel 10 is a transmissive liquid crystal panel, but it is not restrictive. The liquid crystal panel 10 may be a reflective liquid crystal panel or a transflective liquid crystal panel having functions of both of the transmissive and reflective liquid crystal panels.

The liquid crystal panel 10 is manufactured as described below. The array substrate 20 is manufactured by forming the switching elements, the pixel electrode, the terminal, and a transfer electrode in pattern formation steps that include forming a film, patterning by photolithography, and etching and that repeatedly performed on the surface of the first substrate 21, such as the glass substrate, on the side facing the liquid crystals 43. The color filter substrate 30 is manufactured by forming the color filter and the common electrode on the surface of the second substrate 31, such as the glass substrate, on the side facing the liquid crystals 43 in a similar manner as the array substrate 20.

Next, steps until the array substrate 20 and the color filter substrate 30 are bonded to each other are described. First, the array substrate 20 including the pixel electrode is cleaned in a step of cleaning a substrate. Next, in a step of applying an alignment film material, an organic film of polyimide, which is to be a material for the alignment film by printing, for example, is applied to the surface of the array substrate 20 on the side facing the liquid crystals 43 and dried by baking with a hot plate or the like.

Subsequently, alignment processing is performed on the array substrate 20 to which the alignment film material is applied, to thereby form the alignment film. Cleaning, application of the organic film, and the alignment processing are also performed on the color filter substrate 30, to thereby form the alignment film.

Next, applying resin, which is to be the sealing material 40, is performed on the surface of the array substrate 20 or the color filter substrate 30 on the side facing the liquid crystals 43 in a step of applying a sealing material for forming the sealing material 40. Thermosetting resin such as epoxy adhesive or ultraviolet curing resin is used for the sealing material 40.

The array substrate 20 and the color filter substrate 30 that have been prepared as described above are located so as to face each other, and pixels of the liquid crystal panel 10 formed in each of the substrates 20, 30 are aligned to correspond to each other. Then, the array substrate 20 and the color filter substrate 30 are bonded to each other.

Curing the sealing material 40 is performed on the array substrate 20 and the color filter substrate 30 that have been bonded to each other as described above. The step of curing is performed by applying heat or by applying ultraviolet light according to the material for the sealing material 40, for example.

Next, the substrates 20, 30 that have been bonded to each other are divided into individual cells corresponding to individual liquid crystal panels 10 in a cell division step. After the cell division step, the liquid crystals 43 are injected through the liquid crystal inlet in a vacuum in a step of injecting liquid crystals. Further, in a sealing step, photosetting resin, for example, is applied to the liquid crystal inlet portion to which the light is applied, and the liquid crystal inlet portion is sealed.

Next, the first polarizing plate 22 and the second polarizing plate 32 are respectively bonded to the outside of the array substrate 20 and the outside of the color filter substrate 30 in a step of bonding a polarizing plate. Further, the control substrate 15 is installed in a step of installing a control substrate, and thus the liquid crystal panel 10 is completed.

Next, the panel unit 100 of the liquid crystal display device 1 and a step of assembling the panel unit 100 are described. A medium (hereinafter may be referred to as a "filling medium") having a refractive index higher than that of air fills between the liquid crystal panel 10 that has been manufactured as described above and the front protective plate 12 in order to prevent reflection on the interface.

Examples of the filling medium include bonding materials such as an adhesive material, a sticky material, and a sheet. In this embodiment, the bonding material such as a sticky sheet is used as the filling medium. In this case, the sticky sheet is bonded to the front protective plate 12 with a roller device or the like, and the front protective plate 12 is then bonded to a bonding portion of the liquid crystal panel 10 as pressure is applied thereto.

Then, the backlight unit 17 or the like shown in FIG. 1 and a housing, which is not shown, are assembled in the panel unit 100 that has been formed as described above. Consequently, the curved liquid crystal display device 1 in which the liquid crystal panel 10 having the planar display surface 41 is installed is completed.

This embodiment includes the curved liquid crystal display device 1 in which the liquid crystal panel 10 having the display surface 41 of approximately 250 mm in the long-side direction and approximately 200 mm in the short-side direction and having a radius of curvature of 400 mm is curved such that the front surface of the liquid crystal panel 10 is recessed in the short-side direction. This is only an example, and size of the liquid crystal panel 10 may be freely-selected and the curved direction may be the long-side direction. The liquid crystal panel 10 may have any radius of curvature, and the front surface thereof may be recessed or protruding. The liquid crystal panel 10 may be curved into a parabolic shape having an inconstant curvature. Further, the curved direction of the liquid crystal panel 10 may not be one direction in a plane.

In this embodiment, the front protective plate 12 having the nonplanar emission surface 12a being the surface on the observer side is located on the front surface of the liquid crystal panel 10 having the planar display surface 41 in the liquid crystal display device 1, as described above. Thus, the observer can visually identify an image displayed on the planar display surface 41 of the liquid crystal panel 10 as the image having the curved shape.

In a case where an angle (hereinafter may be referred to as an "emission surface angle") θ of the emission surface 12a of the front protective plate 12 with respect to the liquid crystal panel 10 is excessively large or a case where an observation angle with respect to the emission surface 12a in the liquid crystal display device 1 is excessively large, the observer may fail to visually identify light, which is to be an image, and see it as dark part.

Figure 4:
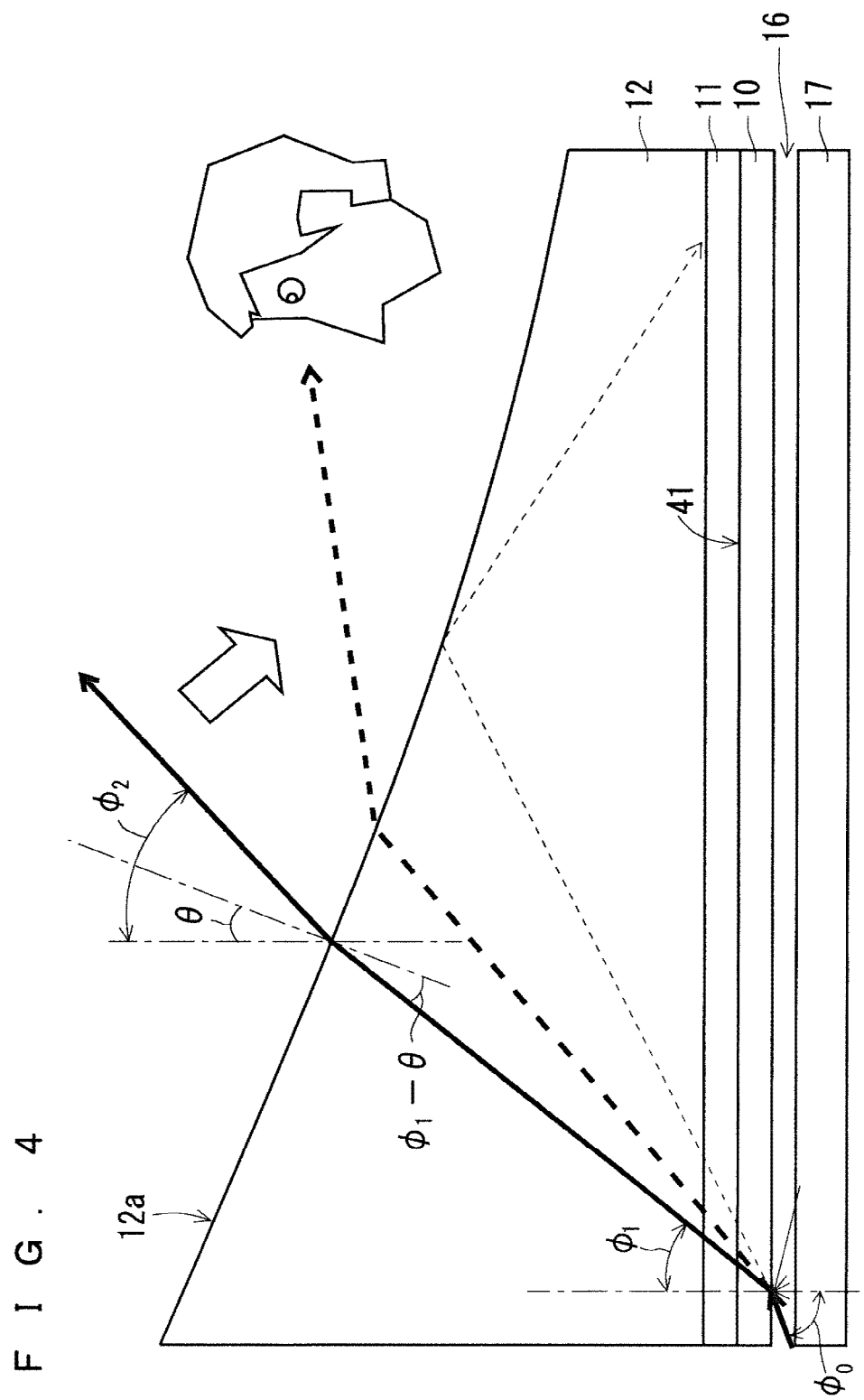
FIG. 4 is a cross-sectional view showing a configuration of the liquid crystal display device 1 that is cut in a curved direction of an emission surface 12a of a front protective plate 12.
Figure 5:
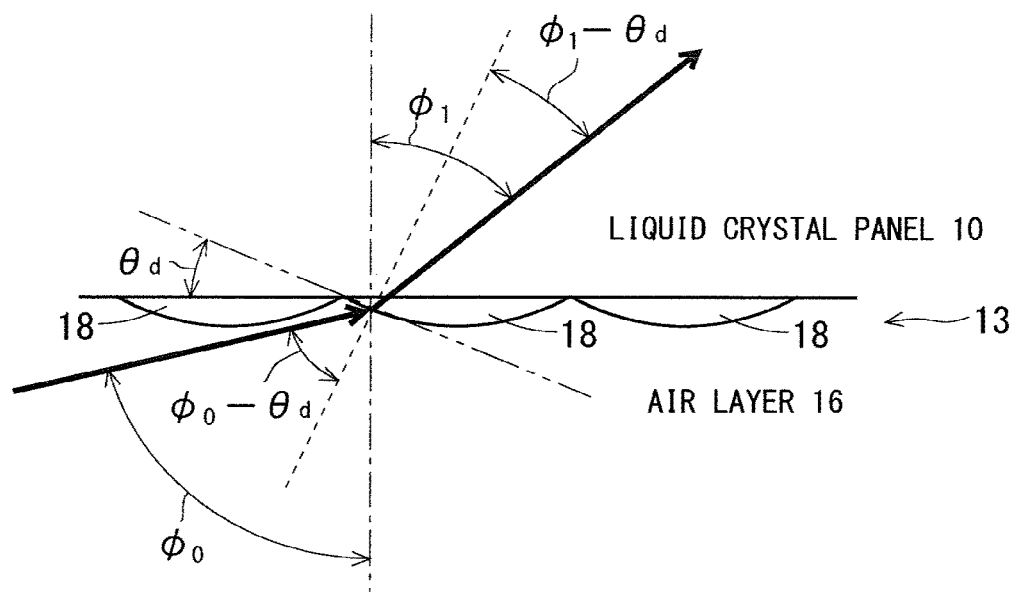
FIG. 5 is an enlarged cross-sectional view showing the vicinity of an incident-light structure 18, which is an example of an optical path changing portion.

To describe this problem in detail, a travelling direction of light from the light source of the backlight unit 17 in the structure of the liquid crystal display device 1 in this embodiment to the observer is described. FIG. 4 is a cross-sectional view showing a configuration of the liquid crystal display device 1 that is cut in the curved direction of the emission surface 12a of the front protective plate 12. FIG. 4 corresponds to a cross-sectional view taken along an A-A line of a cut surface in FIG. 3. The optical path changing portion 13 of the liquid crystal display device 1 is omitted from FIG. 4 for easy interpretation. FIG. 5 is an enlarged cross-sectional view showing the vicinity of an incident-light structure 18, which is an example of the optical path changing portion. The effects of the invention in this embodiment are described with reference to FIGS. 4 and 5.

In this embodiment, the liquid crystal panel 10, the front protective plate 12, and the sticky material 11 being the filling medium that fills between the liquid crystal panel 10 and the front protective plate 12 have the equal refractive index, assuming that n(n>1). The incident-light structure 18 in this embodiment has a maximum inclination angle of $\theta_d$.

An angle (hereinafter may simply be referred to as an "incident angle") at which the light emitted from the backlight unit 17 (hereinafter may be referred to as "backlight light") enters the liquid crystal panel 10 is assumed to be $\phi_0$. An angle (hereinafter may simply be referred to as a "traveling angle") at which the backlight light enters and travels through the liquid crystal panel 10, the front protective plate 12, and the sticky material 11 being the filling medium that fills between the liquid crystal panel 10 and the front protective plate 12 is assumed to be $\phi_1$. An angle (hereinafter may simply be referred to as an "emission angle") at which the backlight light is emitted from the front protective plate 12 is assumed to be $\phi_2$.

Herein, the incident angle $\phi_0$, the travelling angle $\phi_1$, and the emission angle $\phi_2$ have an angle, which is perpendicular to the display surface 41 of the liquid crystal panel 10, defined as 0°. An emission surface angle θ of the front protective plate 12 and the maximum inclination angle $\theta_d$ have an angle, which is parallel to the display surface 41 of the liquid crystal panel 10, defined as 0°.

Herein, Snell's law in which the light enters a boundary at an angle $\phi_a$ from a medium having a refractive index of $n_a$ to a medium having a refractive index of $n_b$ and is emitted at an angle $\phi_b$ is expressed by an expression (1) below. The travelling angle $\phi_1$ and the emission angle $\phi_2$ can be respectively expressed by an expression (2) and an expression (3) below with the use of the expression (1).

[Math 1]
$$n_a \sin\phi_a = n_b \sin\phi_b \quad (1)$$

[Math 2]
$$\phi_1 = \theta_d + \arcsin\frac{\sin(\phi_0 - \theta_d)}{n} \quad (2)$$

[Math 3]
$$\phi_2 = \theta + \arcsin\{n \cdot \sin(\phi_1 - \theta)\} \quad (3)$$

In a case where the measures of this embodiment are not taken, 0 is substituted for the maximum inclination angle $\theta_d$ in the above-mentioned expression (2). For the incident angle $\phi_0$ in a range of greater than or equal to 0° to less than 90° (0°≤$\phi_0$<90°), the light travels through the front protective plate 12 in a direction at the travelling angle $\phi_1$ dependent on the refractive index n due to refraction at an interface of incidence.

Then, the light is emitted into a direction dependent on the refractive index n and the emission surface angle θ. For example, the emission surface 12a of the front protective plate 12 having the refractive index n of n=1.5 and the emission surface angle θ of θ=20° has the emission angle $\phi_2$ of $\phi_2 \approx 53.87°$ when a polar angle of the incident angle $\phi_0$ (hereinafter may be referred to as an "incident polar angle $\phi_0$") of the incident light is $\phi_0=89.9°$. In other words, the light is not emitted into a direction at the angle, which corresponds to the emission angle $\phi_2$, of greater than 53.87° from the direction perpendicular to the display surface 41 of the liquid crystal panel 10, so that an image is not visually recognizable from the direction and is recognized as the dark part.

Figure 6:
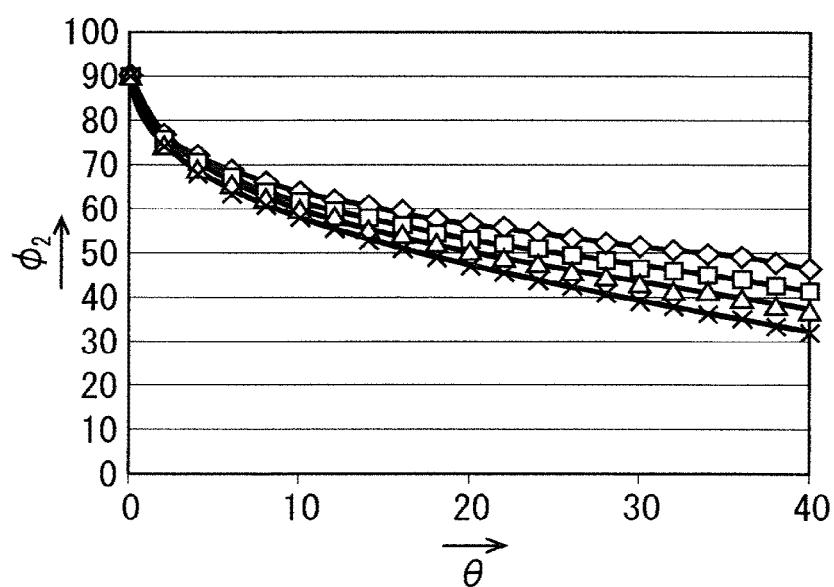
FIG. 6 is a graph showing an example of a relationship between an emission angle $\phi_2$ and an emission surface angle $\theta$.

FIG. 6 is a graph showing an example of a relationship between the emission angle $\phi_2$ and the emission surface angle θ. FIG. 6 shows a dependence of the emission angle $\phi_2$ on the emission surface angle θ in a direction at which a polar angle of emitted light (hereinafter may be referred to as a "emission polar angle") is maximum in a case where the refractive index n is n=1.4 to 1.7.

In FIG. 6, the case where the refractive index n is 1.4 (n=1.4) is indicated by a solid line with symbols "◇". The case where the refractive index n is 1.5 (n=1.5) is indicated by a solid line with symbols "□". The case where the refractive index n is 1.6 (n=1.6) is indicated by a solid line with symbols "Δ". The case where the refractive index n is 1.7 (n=1.7) is indicated by a solid line with symbols "x".

For the incident polar angle $\phi_0$ of approximately 90° ($\phi_0 \approx 90°$), the emission angle $\phi_2$ is maximum. It is clear from FIG. 6 that the larger emission surface angle θ decreases the emission angle $\phi_2$ in all the cases where the refractive index n is 1.4, 1.5, 1.6, and 1.7 (n=1.4, 1.5, 1.6, 1.7).

To solve the problem that an image is recognized as the dark part described above, this embodiment takes the measure to expand the angle of the light traveling through the front protective plate 12. Specifically, the optical path changing portion 13 is provided to change the optical path of the light that enters the optical path changing portion 13 so as to expand the emission angle $\phi_2$ when the incident light that has passed through the front protective plate 12 is emitted from the emission surface 12a of the front protective plate 12.

In this embodiment, as shown in the cross-sectional view in FIG. 1 described above, the optical path changing portion 13 is located on the back-side surface of the liquid crystal panel 10 forming the panel unit 100, namely, the surface opposite to the side facing the first substrate 21 in the thickness direction of the first polarizing plate 22 (hereinafter may simply be referred to as the "surface opposite to the side facing the first substrate 21"). Specifically, as shown in the cross-sectional view in FIG. 5, the incident-light structure 18 having the maximum inclination angle of $\theta_d$ is provided as the optical path changing portion 13.

As shown in the perspective view in FIG. 3, for example, the incident-light structure 18 being an example of the optical path changing portion 13 is formed on the surface, which is located on the back side of the liquid crystal panel 10, of the first polarizing plate 22 opposite to the side facing the first substrate 21. Specifically, the incident-light structure 18 is formed as a lenticular lens structure having a ridge line, in a plane, perpendicular to the curved direction of the front protective plate 12. This can expand the traveling angle $\phi_1$ of the light inside the front protective plate 12, and, as a result, the emission angle $\phi_2$ can be expanded. Therefore, the image can be visually recognized from the wide viewing angle.

It should be noted that if the traveling angle $\phi_1$ of the light inside the front protective plate 12 is made larger than a predetermined angle, the light cannot be emitted due to total reflection by the emission surface 12a of the front protective plate 12.

Figure 7:
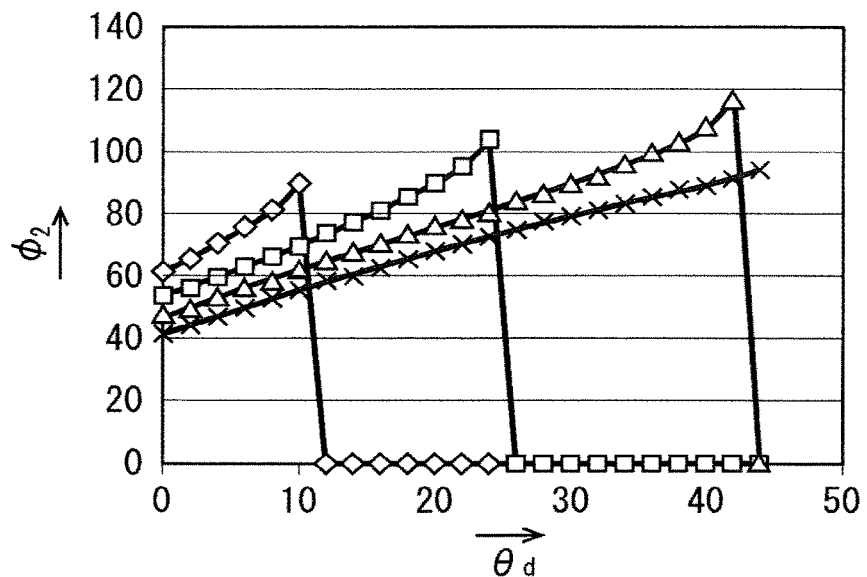
FIG. 7 is a graph showing an example of a relationship between the emission angle $\phi_2$ and a maximum inclination angle $\theta_d$ of an optical path changing portion 13.

FIG. 7 is a graph showing an example of a relationship between the emission angle $\phi_2$ and the maximum inclination angle $\theta_d$ of the optical path changing portion 13. FIG. 7 shows a dependence of the emission angle $\phi_2$ on the maximum inclination angle $\theta_d$ of the optical path changing portion 13 in a case where the optical path changing portion 13 is the incident-light structure 18 and the emission surface angle θ is θ=10° to 40°. Approximately 90° ($\phi_0 \approx 90°$) is substituted for the incident polar angle $\phi_0$.

In FIG. 7, the case where the emission surface angle θ is 10° (θ=10°) is indicated by a solid line with symbols "◇". The case where the emission surface angle θ is 20° (θ=20°) is indicated by a solid line with symbols "□". The case where the emission surface angle θ is 30° (θ=30°) is indicated by a solid line with symbols "Δ". The case where the emission surface angle θ of 40° (θ=40°) is indicated by a solid line with symbols "x".

As shown in FIG. 7, the total reflection occurs if the maximum inclination angles $\theta_d$ of the optical path changing portion 13 are each made larger than approximately 10° when the emission surface angle θ is θ=10°, larger than approximately 24° when θ=20°, and larger than approximately 42° when θ=30°. Thus, utilization efficiency of the backlight light is lower than that in the case where the optical path changing portion 13 is not provided.

Therefore, the maximum inclination angle $\theta_d$ of the optical path changing portion 13 needs to satisfy a relationship of an expression (4) below with the emission surface angle θ formed between the front protective plate 12 and the display surface 41 of the liquid crystal panel 10. Herein, $0<\theta<90°$ and $0<\theta_d<90°$.

[Math 4]

$$\arcsin\frac{\sin(90-\theta_d)}{n} + \theta_d < \arcsin\frac{1}{n} + \theta \quad (4)$$

As described above, the liquid crystal display device 1 includes the liquid crystal panel 10 having the planar display surface 41 and includes the front protective plate 12 that is located so as to face the display surface 41 being the front surface of the liquid crystal panel 10 and that has the nonplanar emission surface 12a opposite to the side facing the display surface 41 in this embodiment. The liquid crystal display device 1 in this embodiment includes the sticky material 11 as the filling medium that fills between the front protective plate 12 and the liquid crystal panel 10.

In this embodiment, the liquid crystal display device 1 includes the optical path changing portion 13 located on the surface, which is the back-side surface of the liquid crystal panel 10, of the first polarizing plate 22 opposite to the side facing the first substrate 21. The optical path changing portion 13 has the shape of the lenticular lens having the ridge line perpendicular to the curved direction of the emission surface 12a of the front protective plate 12. The optical path changing portion 13 can expand the traveling direction of the light inside the front protective plate 12, and thus the emission angle of the light emitted from the emission surface 12a of the front protective plate 12 can be expanded.

Consequently, a nonplanar image can be visually recognized from the relatively wide angle. Therefore, the liquid crystal display device 1 having the relatively wide viewing angle and being capable of displaying the image with relatively high display quality on the nonplanar emission surface 12a, which is the display surface of the liquid crystal display device 1, of the front protective plate 12 can be achieved.

In this embodiment, the sticky material 11 being the filling medium having the refractive index higher than that of the air layer fills between the liquid crystal panel 10 and the front protective plate 12. The liquid crystal display device 1 having such a configuration includes the optical path changing portion 13 of the above-mentioned shape, so that the liquid crystal display device 1 having the relatively wide viewing angle and being capable of displaying the image with the relatively high display quality on the nonplanar emission surface 12a, which is the display surface of the liquid crystal display device 1, of the front protective plate 12 can be achieved, as described above.

In this embodiment, the optical path changing portion 13 is located on the surface, which is the surface of the liquid crystal panel 10 opposite to the display surface 41, of the first polarizing plate 22 opposite to the side facing the first substrate 21. Thus, the liquid crystal display device 1 with high display quality capable of displaying an image recognizable from the wide viewing angle and preventing color mixture and a decrease in contrast can be achieved.

In this embodiment, the surface of the front protective plate 12 facing the display surface 41 of the liquid crystal panel 10 has the planar shape. This can prevent a scattering of the light entering the front protective plate 12, so that the light entering the front protective plate 12 can be easily emitted from a predetermined position of the emission surface 12a of the front protective plate 12.

In this embodiment, the optical path changing portion 13 is formed so as to refract the incident light. Thus, the liquid crystal display device 1 having the relatively wide viewing angle and being capable of displaying the image with the relatively high display quality on the nonplanar emission surface 12a, which is the display surface of the liquid crystal display device 1, of the front protective plate 12 can be achieved, as described above.

In this embodiment, the optical path changing portion 13 is the incident-light structure 18 that has the protruding surface of the liquid crystal panel 10 opposite to the side facing the front protective plate 12 and that has the shape of the lenticular lens having the ridge line perpendicular to the curved direction of the emission surface 12a of the front protective plate 12. The maximum inclination angle $\theta_d$ of the incident-light structure 18 being the optical path changing portion 13 satisfies the relationship of the expression (4) with the emission surface angle $\theta$ formed between the emission surface 12a of the front protective plate 12 and the display surface 41 of the liquid crystal panel 10.

Thus, the traveling angle of the light can be expanded to an angle that the light is not totally reflected inside the front protective plate 12. Therefore, the liquid crystal display device 1 having the relatively wide viewing angle and being capable of displaying the image with the relatively high display quality on the nonplanar emission surface 12a, which is the display surface of the liquid crystal display device 1, of the front protective plate 12 can be achieved, as described above.

Although the traveling angle of the light in the curved direction of the emission surface 12a of the front protective plate 12 in which the effects are particularly significant has been described in detail in the above-described embodiment, the same effects can also be obtained from a direction at a bearing angle diverted from the curved direction, and an image can be visually recognized from a direction at a large angle (polar angle) with respect to the emission surface.

The same effects cannot be obtained from a direction at a bearing angle of strictly 90° with respect to the curved direction even if an optical path changing portion having a shape dependent on an in-plane bearing angle, such as the optical path changing portion 13 in this embodiment, is provided. This, however, is not a problem because the light in the direction at the bearing angle of strictly 90° with respect to the curved direction cannot be perceived with observer's eyes.

Second Embodiment

As described above, the first embodiment includes the incident-light structure 18 as the optical path changing portion 13 that is located on the surface, which is the back-side surface of the liquid crystal panel 10, of the first polarizing plate 22 opposite to the side facing the first substrate 21 and that has the shape of the lenticular lens having the ridge line perpendicular to the curved direction of the surface being the emission surface 12a of the front protective plate 12, as shown in FIGS. 1 and 3.

The shape of the incident-light structure 18 formed as the optical path changing portion 13 is not limited to the shape of the lenticular lens. For example, the incident-light structure 18 has dot shapes, and more particularly, dot shapes having the protruding surface of the liquid crystal panel 10 opposite to the side facing the front protective plate 12 in this embodiment. In this manner, the incident-light structure 18 may have the shape of the lenticular lens or the dot shapes.

As in this embodiment, the incident-light structure 18 formed as the optical path changing portion 13 has the dot shapes, so that the optical path changing portion 13 can be located regardless of the curved direction of the emission surface 12a of the front protective plate 12. Thus, the nonplanar shape of the emission surface 12a of the front protective plate 12 is also suitable in three dimensions. The liquid crystal display device 1 having the relatively wide viewing angle and being capable of displaying the image with the relatively high display quality on the nonplanar emission surface 12a, which is the display surface of the liquid crystal display device 1, of the front protective plate 12 can be achieved, as described above.

Although the liquid crystal display device 1 in the first and second embodiments described above includes, as the optical path changing portion 13, the incident-light structure 18 having the above-described shapes on the surface, which is the back-side surface of the liquid crystal panel 10, of the first polarizing plate 22 opposite to the side facing the first substrate 21, a configuration of the liquid crystal display device is not limited to this configuration.

Figure 8:
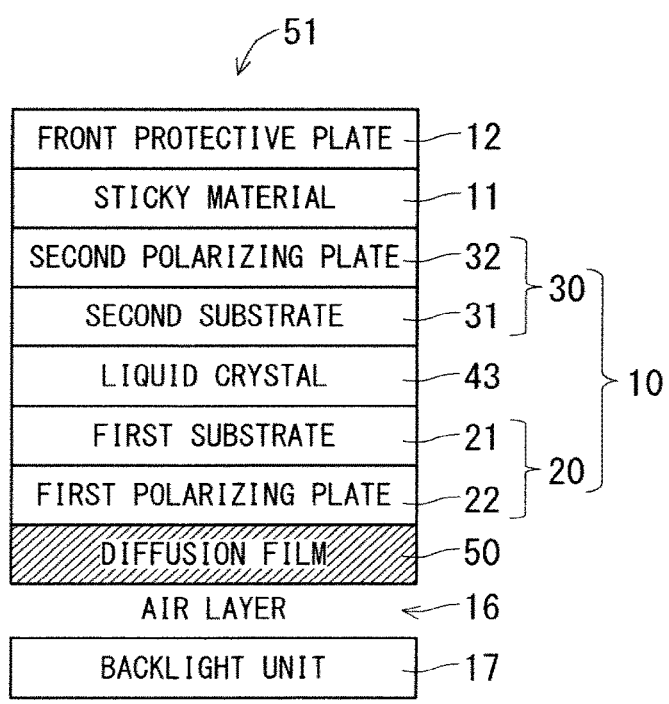
FIG. 8 is a cross-sectional view showing a configuration of a liquid crystal display device 51 in the other embodiment of the present invention.

FIG. 8 is a cross-sectional view showing a configuration of a liquid crystal display device 51 in the other embodiment of the present invention. As shown in FIG. 8, for example, a film (hereinafter may be referred to as a "diffusion film") 50 having the same function of diffusing incident light as the function of the optical path changing portion 13 described above may be bonded as the incident-light structure to the surface, which is the back-side surface of the liquid crystal panel 10, of the first polarizing plate 22 opposite to the side facing the first substrate 21, instead of forming the incident-light structure 18 of the above-mentioned shape as the optical path changing portion 13. The diffusion film 50 functions as the optical path changing portion.

A film having a high haze value of greater than or equal to 20 is used as the diffusion film 50. The diffusion film 50 preferably has the haze value of greater than or equal to 30. The haze value herein is a value expressed by (Td/Tt)×100 [unit: %] with a total light transmittance (Tt) and a diffuse transmittance (Td). The total transmittance (Tt) represents a total amount of light beams passing through a test sample. The diffuse transmittance (Td) represents a transmittance of light deviating by greater than or equal to 2.5° from an axis of incident light.

As described above, the diffusion film 50 having the high haze value of greater than or equal to 20 is used as the optical path changing portion, so that the traveling angle of the light inside the front protective plate 12 can be sufficiently expanded. Therefore, the liquid crystal display device having the relatively wide viewing angle and being capable of displaying the image with the relatively high display quality on the nonplanar emission surface 12a, which is the display surface of the liquid crystal display device, of the front protective plate 12 can be reliably achieved, as described above.

In the first and second embodiments described above, the optical path changing portion 13 or the diffusion film 50 is located on the surface, which is located opposite to the side facing the first substrate 21, of the first polarizing plate 22 of the liquid crystal panel 10 to expand the traveling angle of the light inside the front protective plate 12 and to expand the angle of the light emitted from the emission surface 12a, but a configuration is not limited to this configuration. The optical path changing portion 13 or the diffusion film 50 may be located on the emission surface 12a of the front protective plate 12 to expand the angle of the light emitted from the emission surface 12a.

In the first and second embodiments as described above, the optical path changing portion 13 formed so as to refract the incident light or the diffusion film 50 formed so as to diffuse the incident light may be located on (a1) the emission surface 12a of the front protective plate 12 or (a2) the surface, which is the surface of the liquid crystal panel 10 opposite to the display surface 41, of the first polarizing plate 22 opposite to the side facing the first substrate 21.

The optical path changing portion 13 or the diffusion film 50 is located on (a1) or (a2), so that the liquid crystal display device 1 having the relatively wide viewing angle and being capable of displaying the image with the relatively high display quality on the nonplanar emission surface 12a, which is the display surface, of the front protective plate 12 can be achieved, as described above.

Third Embodiment

As shown in FIGS. 1 and 3, the first and second embodiments described above include the incident-light structure 18 as the optical path changing portion 13 located on the surface, which is the back-side surface of the liquid crystal panel 10, of the first polarizing plate 22 opposite to the side facing the first substrate 21. A configuration is not limited to this configuration. For example, as shown in FIG. 9, any components from the front protective plate 12 to a liquid crystal panel 10A closely bonded to each other may include an optical path changing portion 60 as an internal scattering structure formed so as to scatter the incident light.

Figure 9:
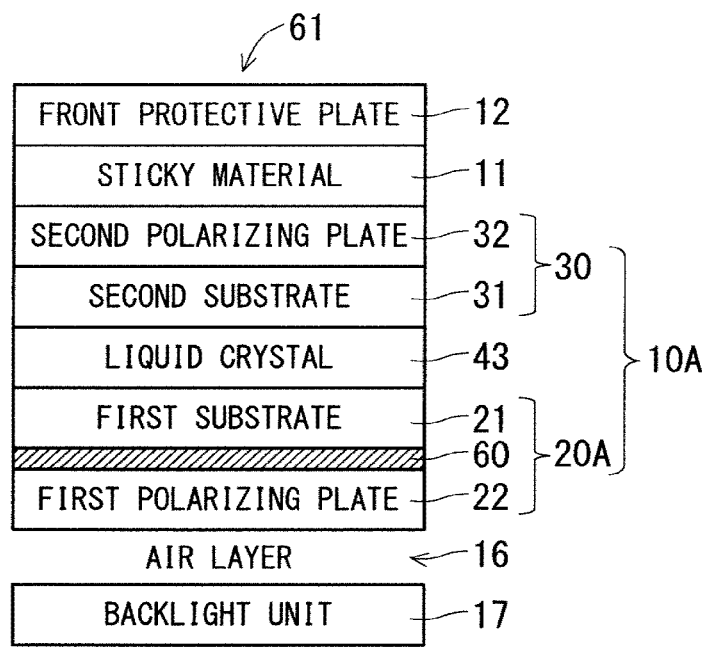
FIG. 9 is a cross-sectional view showing a configuration of a liquid crystal display device 61 in a third embodiment of the present invention.

FIG. 9 is a cross-sectional view showing a configuration of a liquid crystal display device 61 in a third embodiment of the present invention. The same components as those of the liquid crystal display device 1 in the first and second embodiments described above are denoted by the same references and the common descriptions are omitted here.

The liquid crystal display device 61 in this embodiment includes the optical path changing portion 60 as the internal scattering structure located between the first substrate 21 and the first polarizing plate 22 that form an array substrate 20A of the liquid crystal panel 10A. In other words, the array substrate 20A includes the first substrate 21, the optical path changing portion 60, and the first polarizing plate 22. The liquid crystal panel 10A includes the array substrate 20A, the color filter substrate 30, and the liquid crystals 43.

In this embodiment, the optical path changing portion 60 is made of a sticky material. The sticky material for bonding the first polarizing plate 22 to the first substrate 21 of the array substrate 20A of the liquid crystal panel 10A contains scattering particles, to thereby form the optical path changing portion 60. In other words, the optical path changing portion 60 is located in the sticky material that bonds the first substrate 21 of the liquid crystal panel 10A and the first polarizing plate 22 together.

A material for the scattering particles may be an inorganic material or an organic material. The scattering particles have a refractive index higher than a refractive index of a member that contains the scattering particles, and this embodiment includes the scattering particles having a refractive index higher than a refractive index of the sticky material that contains the scattering particles.

When the scattering particles each have a particle diameter of less than 100 nm, a scattering of light is insufficient in the optical path changing portion 60. Thus, the scattering particle preferably has a particle diameter of greater than or equal to 100 nm. Specifically, acrylic beads having a particle diameter of 200 nm, for example, are used as the scattering particles. A cross-sectional shape of the scattering particle is truly circular in this embodiment. A cross-sectional shape of the scattering particle is not limited to this, and may be elliptical or any other shapes.

In this manner, a difference in refractive index between the scattering particles and the member that contains the scattering particles and is the sticky material in this embodiment as well as a particle diameter of the scattering particles, shapes of the scattering particles such as the cross-sectional shape, and a density of the scattering particles are adjusted so as to set the haze value of the optical path changing portion 60 to 30, for example. The optical path changing portion 60 preferably has the haze value of greater than or equal to 20, more preferably greater than or equal to 30.

In this embodiment as described above, the sticky material located between the first substrate 21 and the first polarizing plate 22 that form the array substrate 20A of the liquid crystal panel 10A contains the scattering particles, so that the optical path changing portion 60 is formed as the internal scattering structure located between the first substrate 21 and the first polarizing plate 22. Thus, the optical path changing portion 60 can be relatively easily provided at a low cost.

Figure 10:
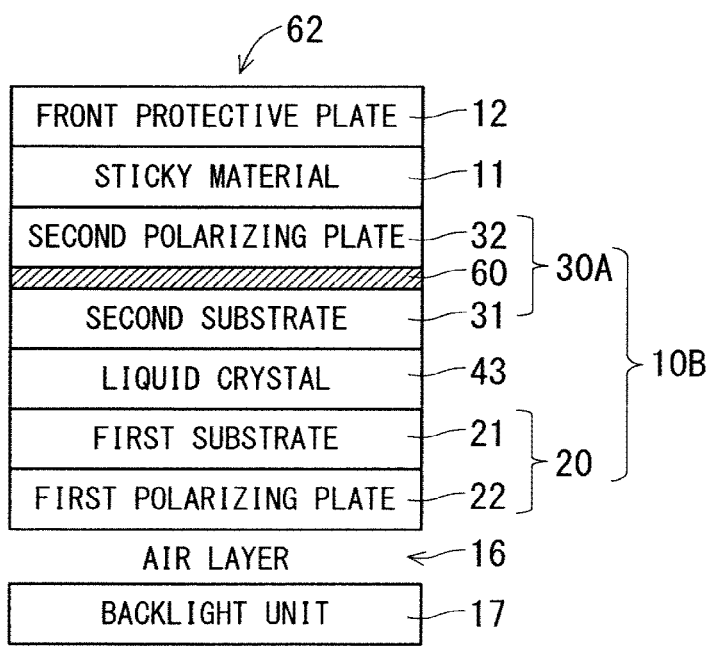
FIG. 10 is a cross-sectional view showing a configuration of a liquid crystal display device 62 in the other example of the liquid crystal display device in the third embodiment of the present invention.

FIG. 10 is a cross-sectional view showing a configuration of a liquid crystal display device 62 in the other example of the liquid crystal display device in the third embodiment of the present invention. The same components as those of the liquid crystal display devices in the embodiments described above are denoted by the same references and the common descriptions are omitted here.

Although the liquid crystal display device 61 shown in FIG. 9 described above includes the optical path changing portion 60 located between the first substrate 21 and the first polarizing plate 22 that form the array substrate 20A, the optical path changing portion 60 may be located between the second substrate 31 and the second polarizing plate 32 that form a color filter substrate 30A in a similar manner as the liquid crystal display device 62 shown in FIG. 10.

The liquid crystal display device 62 shown in FIG. 10 includes the optical path changing portion 60 as an internal diffusion structure located between the second substrate 31 and the second polarizing plate 32 that form the color filter substrate 30A of a liquid crystal panel 10B. The color filter substrate 30A includes the second substrate 31, the optical path changing portion 60, and the second polarizing plate 32. The liquid crystal panel 10B includes the color filter substrate 30A, the array substrate 20, and the liquid crystals 43.

The liquid crystal display device 62 shown in FIG. 10 includes the optical path changing portion 60 made of the sticky material in a similar manner as the optical path changing portion 60 in the third embodiment described above. The sticky material for bonding the second polarizing plate 32 to the second substrate 31 of the color filter substrate 30A of the liquid crystal panel 10B contains the scattering particles, to thereby form the optical path changing portion 60. In other words, the optical path changing portion 60 is located in the sticky material that bonds the second substrate 31 of the liquid crystal panel 10B and the second polarizing plate 32 together.

Figure 11:
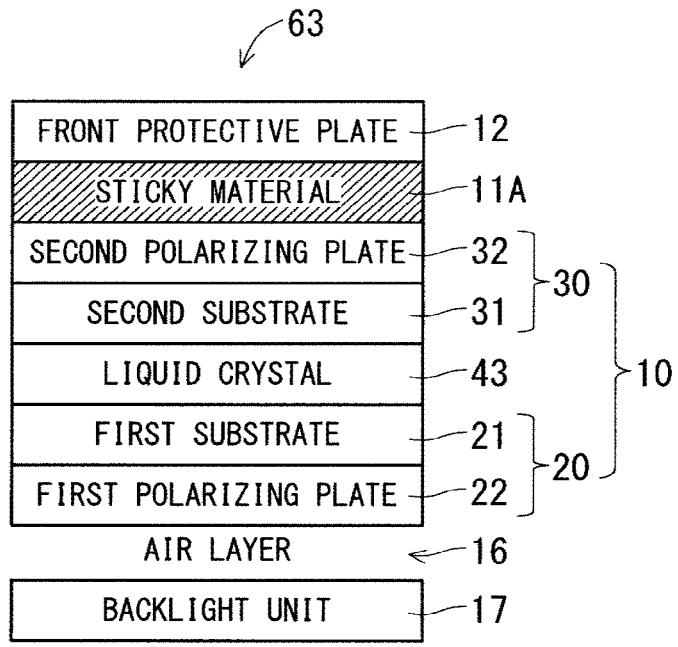
FIG. 11 is a cross-sectional view showing a configuration of a liquid crystal display device 63 in the other example of the liquid crystal display device in the third embodiment of the present invention.

FIG. 11 is a cross-sectional view showing a configuration of a liquid crystal display device 63 in the other example of the liquid crystal display device in the third embodiment of the present invention. The same components of the liquid crystal display device 63 shown in FIG. 11 as those of the liquid crystal display devices in the embodiments described above are denoted by the same references and the common descriptions are omitted here.

In the liquid crystal display devices 61, 62 shown in FIGS. 9 and 10 described above, the sticky material for bonding the first polarizing plate 22 to the first substrate 21 of the liquid crystal panel 10A or the sticky material for bonding the second polarizing plate 32 to the second substrate 31 of the liquid crystal panel 10B contains the scattering particles, to thereby form the optical path changing portion 60. Instead, the filling medium that fills between the front protective plate 12 and the liquid crystal panel 10 may contain the scattering particles, to thereby form an optical path changing portion 11A, as shown in FIG. 11.

The liquid crystal display device 63 shown in FIG. 11 includes the optical path changing portion 11A as the internal scattering structure located between the front protective plate 12 and the liquid crystal panel 10, and more particularly, between the front protective plate 12 and the second polarizing plate 32 of the liquid crystal panel 10. The optical path changing portion 11A is located in the filling medium between the front protective plate 12 and the liquid crystal panel 10, and more particularly, in the filling medium between the front protective plate 12 and the second polarizing plate 32 of the liquid crystal panel 10.

The filling medium is the sticky material, for example. The optical path changing portion 11A is made of the sticky material in a similar manner as the optical path changing portion 60 shown in FIGS. 9 and 10 described above, for example. The sticky material for bonding the front protective plate 12 to the liquid crystal panel 10 contains the scattering particles, to thereby form the optical path changing portion 11A.

For example, the sticky material is a sticky sheet, and the optical path changing portion 11A is made of the sticky sheet. For the optical path changing portion 11A made of the sticky sheet, the sticky sheet that contains the scattering particles forms the optical path changing portion 11A.

Figure 12:
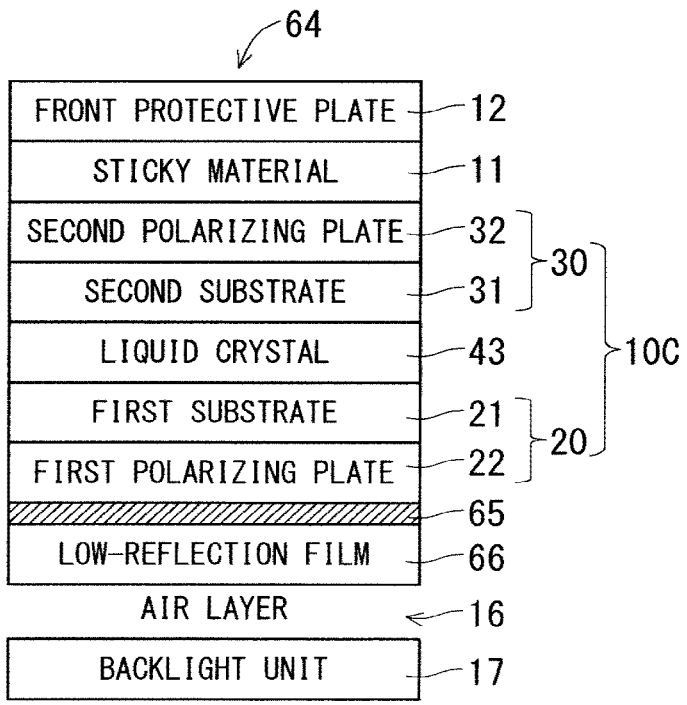
FIG. 12 is a cross-sectional view showing a configuration of a liquid crystal display device 64 in the other example of the liquid crystal display device in the third embodiment of the present invention.

FIG. 12 is a cross-sectional view showing a configuration of a liquid crystal display device 64 in the other example of the liquid crystal display device in the third embodiment of the present invention. The same components as those in the embodiments described above are denoted by the same references and the common descriptions are omitted here.

The liquid crystal display device 64 shown in FIG. 12 includes an optical path changing portion 65 located between the first polarizing plate 22 and an optical film 66 such as a low-reflection film bonded to the back side of the first polarizing plate 22. In this manner, the optical path changing portion 65 may also be made of the sticky material that contains the scattering particles located between the first polarizing plate 22 and the optical film 66 such as the low-reflection film bonded to the back side of the first polarizing plate 22.

The process of bonding the sticky material as the optical path changing portion 65 that contains the scattering particles and the optical film 66 such as the low-reflection film to the first polarizing plate 22 of the liquid crystal panel 10C is relatively easy. The optical film 66 such as the low-reflection film can be retrofitted to various polarizing plates, so that the optical film 66 has a high degree of flexibility in design.

Therefore, the configuration shown in FIG. 12 allows the optical path changing portion 65 to be relatively easily formed without lowering the degree of flexibility. The optical film 66 in the configuration shown in FIG. 12 also has the function of protecting the sticky material being the optical path changing portion 65.

The optical path changing portion is not limited to the configurations shown in FIGS. 9 to 12, and may be formed as the internal scattering structure by the scattering member such as the scattering particles located near the pixels in the liquid crystal panel 10, for example.

In this embodiment as described above, the optical path changing portions 60, 11A are formed as the internal scattering structures so as to scatter the incident light, and may be located (b1) in the sticky material that bonds the first substrate 21 of the liquid crystal panel 10A and the first polarizing plate 22 together, as shown in FIG. 9, (b2) in the sticky material that bonds the second substrate 31 and the second polarizing plate 32 together, as shown in FIG. 10, (b3) in the filling medium located between the liquid crystal panel 10 and the front protective plate 12, as shown in FIG. 11, or (b4) near the pixels in the liquid crystal panel 10. This allows the optical path changing portions 60, 11A to be relatively easily provided at a low cost.

As shown in FIGS. 1 to 12, the first to third embodiments described above include the examples of measures against the structure in which the filling medium having the refractive index higher than that of the air layer fills between the front protective plate 12 and the liquid crystal panel 10, 10A, 10B, 10C.

The optical light changing portion is formed so as to scatter or refract the incident light. Thus, the liquid crystal display device 1 having the relatively wide viewing angle and being capable of displaying the image with the relatively high display quality on the nonplanar emission surface 12a, which is the display surface, of the front protective plate 12 can be achieved, as described above.

The optical path changing portion may be located (A1) between the emission surface of the front protective plate and the surface of the front protective plate facing the liquid crystal panel, (A2) in the filling medium, or (A3) between the surface of the second polarizing plate of the liquid crystal panel opposite to the side facing the second substrate and the surface of the first polarizing plate opposite to the side facing the first substrate.

The optical path changing portion is located in the position of (A1), (A2), or (A3), so that the liquid crystal display device 1 having the relatively wide viewing angle and being capable of displaying the image with the relatively high display quality on the nonplanar emission surface 12a, which is the display surface, of the front protective plate 12 can be achieved, as described above.

Fourth Embodiment

In a case where a structure includes the air layer located between the front protective plate 12 and the liquid crystal panel 10, the effects of the present invention cannot be obtained even if the liquid crystal panel 10 includes the optical path changing portion. Thus, the front protective plate 12 includes the optical path changing portion instead that the liquid crystal panel 10 or the sticky material 11 as the filling medium includes the optical path changing portion in this embodiment.

FIG. 13 is a cross-sectional view showing a configuration that is cut in the curved direction of the emission surface 12a of the front protective plate 12. FIG. 13 is a diagram for describing the effects of the present invention in this embodiment. FIG. 13 corresponds to a cross-sectional view taken along the A-A line of the cut surface in FIG. 3. The optical path changing portion is omitted from FIG. 13 for easy interpretation. FIG. 14 is a cross-sectional view showing a configuration of a liquid crystal display device 2 in the fourth embodiment of the present invention. With reference to FIGS. 13 and 14, the effects of the present invention in this embodiment are described.

In this embodiment, an optical path changing portion 71 having the same shape as that of the optical path changing portion 60 in the first embodiment or the second embodiment is formed on the back surface of the front protective plate 12 opposite to the emission surface 12a.

In the case where the structure includes the front protective plate 12 and the liquid crystal panel 10, 10A, 10B, 10C closely bonded to each other with the sticky material as in the first to third embodiments described above, bonding may fail in the step of bonding the front protective plate 12 and the liquid crystal panel 10, 10A, 10B, 10C together. When bonding fails, yields may decrease and a manufacturing cost may increase.

In this embodiment, an air layer 70 located between the liquid crystal panel 10 and the front protective plate 12 eliminates the need to closely bond the front protective plate 12 and the liquid crystal panel 10 to each other. Thus, the liquid crystal display device 2 can be achieved at a lower cost. Moreover, the yields of the liquid crystal display device 2 can improve.

FIG. 15 is a cross-sectional view showing a configuration of a liquid crystal display device 73 in the other example of the liquid crystal display device in the fourth embodiment of the present invention. The liquid crystal display device 2 shown in FIG. 14 described above includes the optical path changing portion 71, which has the same shape as that of the optical path changing portions 60, 11A, 65 in the first embodiment to third embodiments described above, located on the back surface of the front protective plate 12. Instead, an optical film such as a diffusion film having the same function as that of the optical path changing portions 60, 11A, 65 in the first to third embodiments described above may be bonded as the optical path changing portion 72, as shown in FIG. 15.

Moreover, the optical path changing portion may be formed on or the optical film having the function of the optical path changing portion may be bonded to the front surface being the emission surface 12a of the front protective plate 12 instead of the back surface of the front protective plate 12.

The optical path changing portion is located on the surface of the front protective plate 12 facing the display surface 41 of the liquid crystal panel 10 or on the surface of the front protective plate 12 opposite to the surface facing the display surface 41 in the configuration including the air layer 70 located between the liquid crystal panel 10 and the front protective plate 12 as described above. Consequently, the same effects as those in the first embodiment described above can be obtained.

Fifth Embodiment

FIG. 16 is a cross-sectional view showing a configuration of a liquid crystal display device 80 in a fifth embodiment of the present invention. The fourth embodiment described above includes the method for forming the optical path changing portion 71, 72 having the above-mentioned functions on the back surface of the front protective plate 12. Instead, an optical film 82 such as a low-reflection film may be further provided on the back surface of the front protective plate 12, and the sticky material for bonding the optical film 82 to the front protective plate 12 contains the scattering particles to form an optical path changing portion 81 in a similar manner as the liquid crystal display device 80 shown in FIG. 16.

Figure 17:
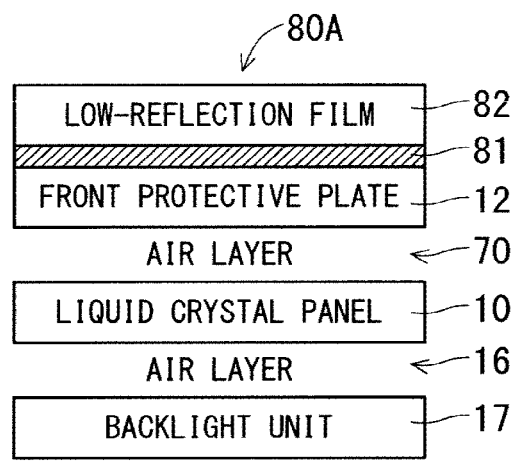
FIG. 17 is a cross-sectional view showing a configuration of a liquid crystal display device 80A in the other example of the liquid crystal display device in the fifth embodiment of the present invention.

FIG. 17 is a cross-sectional view showing a configuration of a liquid crystal display device 80A in the other example of the liquid crystal display device in the fifth embodiment of the present invention. As shown in FIG. 17, a method may further include the optical film 82 such as the low-reflection film on the front surface being the emission surface 12a of the front protective plate 12 and may include the sticky material that bonds the optical film 82 to the front protective plate 12 and contains the scattering particles to form the optical path changing portion 81.

In comparison with the fourth embodiment, this embodiment can further lower the cost.

Instead of the configurations in the first to fifth embodiments described above, a configuration may further include a touch panel on the front surface or the back surface of the front protective plate 12 and may include the sticky material that bonds the touch panel to the front protective plate 12 or to the liquid crystal panel 10 and that contains the scattering particles. In this case, the sticky material that contains the scattering particles forms the optical path changing portion. In other words, the optical path changing portion is located in the sticky material and formed so as to scatter the incident light.

With such a configuration, the liquid crystal display device having the relatively wide viewing angle and being capable of displaying the image with the relatively high display quality on the nonplanar emission surface 12a, which is the display surface of the liquid crystal display device, of the front protective plate 12 can be achieved, as described above.

In the first to fifth embodiments described above, the number of the liquid crystal panel 10 is one, but a plurality of liquid crystal panels 10 may be located adjacent to each other such that surfaces thereof form a polar angle of greater than 0° and less than 360°.

Figure 18:
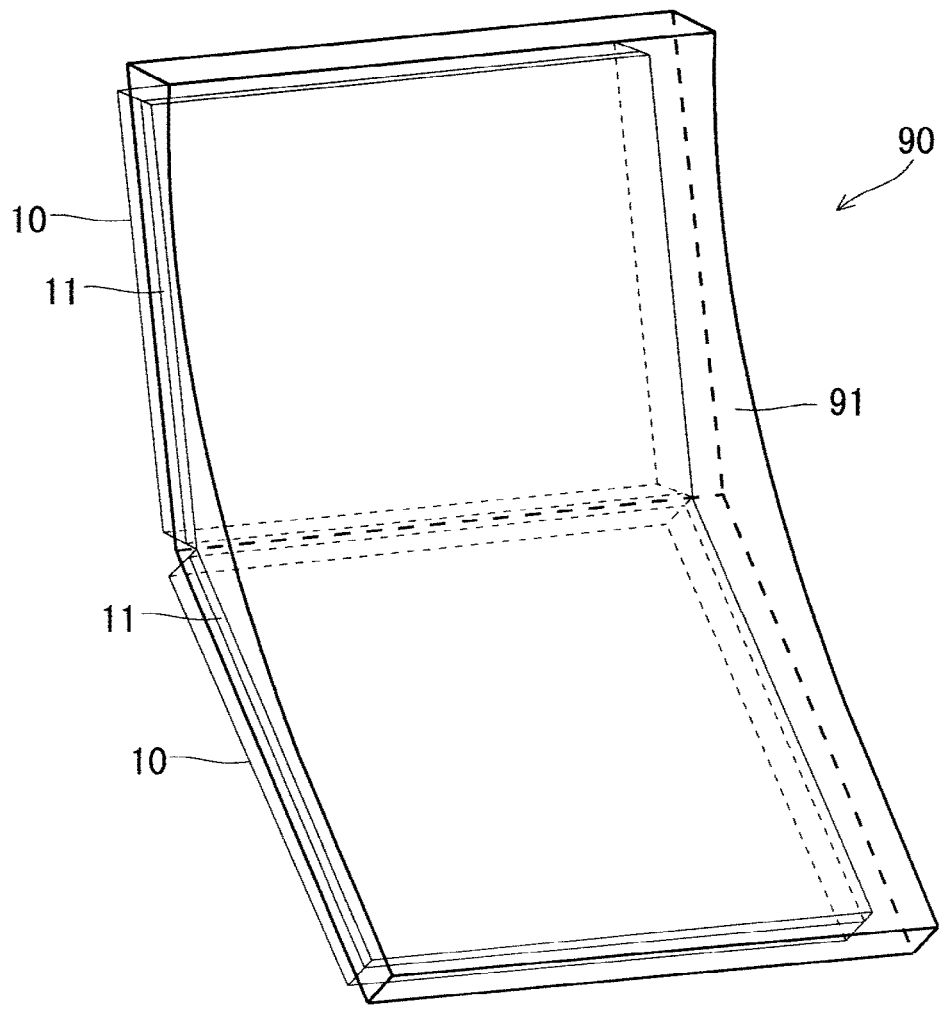
FIG. 18 is a perspective view showing an example of a configuration of a liquid crystal display device 90 including two liquid crystal panels 10.

FIG. 18 is a perspective view showing an example of a configuration of a liquid crystal display device 90 including two liquid crystal panels 10. FIG. 18 shows, as an example, the liquid crystal display device having a curved shape in one direction and including the two liquid crystal panels 10 located adjacent to each other such that the surfaces of the liquid crystal panels 10 form a polar angle of 140°. The large liquid crystal display device 90 whose curved shape is further emphasized can be achieved by using the two liquid crystal panels 10 shown in FIG. 18.

In the case where the two liquid crystal panels 10 located adjacent to each other form the liquid crystal display device 90 as shown in FIG. 18, a front protective plate 91 has a shape that two front protective plates having the same configuration as that of the front protective plate 12 in the first embodiment shown in FIG. 3 described above are connected to each other. An emission surface of the front protective plate 91 being a display surface of the liquid crystal display device 90 has a nonplanar shape, and more particularly, a recessed curved shape. A surface of the front protective plate 91 opposite to the emission surface is divided into a portion facing a display surface 41 of one of the two liquid crystal panels 10 and a portion facing a display surface 41 of the other liquid crystal panel 10.

The surface of the front protective plate 91 facing the display surface 41 of the one liquid crystal panel 10 has a shape along the display surface 41 of the one liquid crystal panel 10. Similarly, the surface of the front protective plate 91 facing the display surface 41 of the other liquid crystal panel 10 has a shape along the display surface 41 of the other liquid crystal panel 10.

In the example shown in FIG. 18, the display surfaces 41 of the two liquid crystal panels 10 both have the planar shape. Therefore, the surface of the front protective plate 91 facing the display surface 41 of the one liquid crystal panel 10 has the planar shape, and more particularly, the planar shape along the display surface 41 of the one liquid crystal panel 10. Similarly, the surface of the front protective plate 91 facing the display surface 41 of the other liquid crystal panel 10 has the planar shape, and more particularly, the planar shape along the display surface 41 of the other liquid crystal panel 10.

Although FIG. 18 shows the liquid crystal display device 90 having the configuration in which the two liquid crystal panels 10 are located adjacent to each other in the vertical direction to the paper plane, the liquid crystal display device 90 may have a configuration in which the two liquid crystal panels 10 are located adjacent to each other in the horizontal direction to the paper plane. For this configuration, the liquid crystal panel 10 or the front protective plate 12 is provided with the optical path changing portion as in the first to fifth embodiments described above, so that an observer can visually recognize an image even if an observation angle of the observer with respect to the emission surface 12a of the liquid crystal display device 90 is large in the horizontal direction being the curved direction, or large in the slanting direction. Also in a case where the optical path changing portion does not have a dependence on the in-plane bearing angle, the observer can visually recognize an image even if the observation angle of the observer with respect to the emission surface 12a of the liquid crystal display device 90 is large in the vertical direction.

As described above, the plurality of liquid crystal panels 10 are located such that the display surfaces of the plurality of liquid crystal panels 10 adjacent to each other form an angle of greater than 0° and less than 360°, and thus the liquid crystal display device whose curved shape is further emphasized can be achieved. Moreover, the plurality of liquid crystal panels 10 display one image, and thus the large liquid crystal display device capable of displaying a relatively large curved image can be achieved.

Each embodiment described above is illustrative in the present invention, and the above embodiments can be arbitrarily combined within the scope of the invention. Any components of each embodiment can be appropriately varied or omitted.

While the invention has been shown and described in detail, the foregoing description is in all aspects illustrative and not restrictive. It is therefore understood that numerous modifications and variations can be devised without departing from the scope of the invention.

DESCRIPTION OF NUMERALS 1, 2, 51, 61 to 64, 73, 80, 80A, 90 liquid crystal display device; 10, 10A, 10B, 10C liquid crystal panel; 11 sticky material; 12, 91 front protective plate; 11A, 13, 60, 65, 71, 81 optical path changing portion; 14 flexible flat cable (FFC); 15 control substrate; 16, 70 air layer; 17 backlight unit; 18 incident-light structure; 20, 20A array substrate; 21 first substrate; 22 polarizing plate; 30, 30A color filter substrate; 31 second substrate; 32 polarizing plate; 40 sealing material; 41 panel display surface; 42 terminal; 43 liquid crystal; 50, 72 diffusion film; 66, 82 low-reflection film.

The invention claimed is:

1. A liquid crystal display device, comprising:
a liquid crystal panel with a display surface of a planar shape in which a rectangular display region including a plurality of pixels located therein is formed, said liquid crystal panel including
a first substrate having a rectangular shape,
a second substrate that is located to face said first substrate in a position closer to an observer side than said first substrate and that has the rectangular shape,
liquid crystals sandwiched between said first substrate and said second substrate,
a first polarizing plate bonded to a surface of said first substrate opposite to the side facing said liquid crystals, and
a second polarizing plate bonded to a surface of said second substrate opposite to the side facing said liquid crystals;
a front protective plate that is located to face said display surface of said liquid crystal panel in a position closer to the observer side than said liquid crystal panel and that has an emission surface of a nonplanar shape, opposite to the side facing said display surface;
a backlight; and
an optical path changing portion that is located between said emission surface of said front protective plate and an air layer and that changes an optical path of incident light to expand an emission angle when said incident light is emitted from said emission surface, the air layer being positioned closer to the backlight than any optical path changing portion,
wherein a filling medium having a refractive index higher than that of said air layer fills between said liquid crystal panel and said front protective plate,
the backlight emits light directly to the air layer,
the air layer extends over an entire length of the backlight, and the liquid crystal display device comprises only one air layer intersecting a line from the backlight to the front protective plate.

2. The liquid crystal display device according to claim 1, wherein said optical path changing portion is formed to refract said incident light and is located on a surface of said first polarizing plate opposite to the side facing said first substrate.

3. The liquid crystal display device according to claim 1, wherein
said first polarizing plate is bonded to the surface of said first substrate opposite to the side facing said liquid crystals with a sticky material,
said second polarizing plate is bonded to the surface of said second substrate opposite to the side facing the said liquid crystals with a sticky material, and
said optical path changing portion is formed to scatter said incident light and is located (b1) in said sticky material that bonds said first substrate of said liquid crystal panel and said first polarizing plate thereof together, (b2) in said sticky material that bonds said second substrate and said second polarizing plate together, or (b4) near said pixels in said liquid crystal panel.

4. The liquid crystal display device according to claim 1, further comprising an optical film bonded to the surface of said first polarizing plate of said liquid crystal panel opposite to the side facing said first substrate or bonded to said emission surface of said front protective plate with a sticky material,
wherein said optical path changing portion is formed to scatter said incident light and is located in said sticky material for bonding said optical film.

5. The liquid crystal display device according to claim 1, wherein
said liquid crystal panel and said front protective plate includes an air layer located therebetween, and
said optical path changing portion is located on the surface of said front protective plate facing said display surface of said liquid crystal panel or on the surface of said front protective plate opposite to the surface facing said display surface.

6. The liquid crystal display device according to claim 5, wherein said optical path changing portion is formed to refract said incident light.

7. The liquid crystal display device according to claim 5, wherein
said liquid crystal panel and said front protective plate includes the air layer located therebetween,
said liquid crystal display device further comprises an optical film that is bonded to the surface of said front protective plate facing said liquid crystal panel or to the surface of said front protective plate opposite to the surface facing said display surface with a sticky material and that protects said sticky material, and
said optical path changing portion is formed to scatter said incident light and is located in said sticky material that bonds said optical film and said front protective plate together.

8. The liquid crystal display device according to claim 1, wherein said optical path changing portion has a haze value of greater than or equal to 20.

9. The liquid crystal display device according to claim 1, wherein
said optical path changing portion has dot shapes having a protruding surface of said liquid crystal panel opposite to the side facing said front protective plate or a lenticular lens shape having a ridge line perpendicular to a curved direction, and
a maximum inclination angle $\theta_d$ of said optical path changing portion satisfies a following relationship with the emission surface angle $\theta$ that is an angle formed between said emission surface of said front protective plate and said display surface of said liquid crystal panel, where the front protective plate, the liquid crystal panel, and the medium between the front protective plate and the liquid crystal panel have the equal refractive index n of greater than 1, where an emission surface angle $\theta$ is taken to be $0<\theta<90°$.

10. The liquid crystal display device according to claim 1, further comprising a touch panel bonded to said front protective plate or said liquid crystal panel with a sticky material,
wherein said optical path changing portion is formed so as to scatter said incident light and is located in said sticky material.

11. The liquid crystal display device according to claim 1, comprising a plurality of said liquid crystal panels, display surfaces of said plurality of liquid crystal panels adjacent to each other forming an angle of greater than 0° and less than 360°.

12. The liquid crystal display device according to claim 1, wherein said optical path changing portion is located between said first substrate and said first polarizing plate and is made of a sticky material for bonding said first substrate and said first polarizing plate, said optical path changing portion containing scattering particles.

13. The liquid crystal display device according to claim 1, wherein said optical path changing portion is located between said second substrate and said second polarizing plate and is made of a sticky material for bonding said second substrate and said second polarizing plate, said optical path changing portion containing scattering particles.

14. The liquid crystal display device according to claim 1, wherein said front protective plate has a concavely curved shape.

* * * * *